United States Patent [19]

Hoadley et al.

[11] 4,235,104
[45] Nov. 25, 1980

[54] NORMALIZED COEFFICIENT OF LIFT INDICATOR

[75] Inventors: Arthur W. Hoadley; Raymond S. Vander Bok, both of Portage, Mich.

[73] Assignee: The Board of Trustees of Western Michigan University, Kalamazoo, Mich.

[21] Appl. No.: 21,617

[22] Filed: Mar. 19, 1979

[51] Int. Cl.$^3$ .............................................. G01C 21/00
[52] U.S. Cl. ..................................................... 73/180
[58] Field of Search ....................... 73/180, 147, 178R

[56] References Cited

U.S. PATENT DOCUMENTS

| 2,986,033 | 5/1961 | Spencer | 73/180 |
|---|---|---|---|
| 3,587,311 | 6/1971 | Hays | 73/180 |
| 3,880,002 | 4/1975 | Gallington | 73/180 |
| 3,885,431 | 5/1975 | Gallington | 73/180 |

Primary Examiner—Donald O. Woodiel
Attorney, Agent, or Firm—Blanchard, Flynn, Thiel, Boutell & Tanis

[57] ABSTRACT

An aircraft instrumentation system having an indicator which indicates a linearly variable ratio of the pressure differential between two pressures at two different locations on the aircraft wing and two pressures located remote therefrom. An electrical circuit is responsive to the pressures to determine and indicate the aforesaid ratio. Each of the locations wherein pressure is to be detected is positioned so that the aforesaid ratio remains nondouble valued independent of electrical compensation circuits which are responsive to variations in aircraft power and flap setting to thereby provide a ratio which is a function only of a normalized coefficient of lift ($C_{LN}$*) and to thereby provide the pilot with an indication at all times as to the aircraft's orientation relative to the maximum coefficient of lift.

12 Claims, 7 Drawing Figures

NORMALIZED COEFFICIENT OF LIFT INDICATOR

FIELD OF THE INVENTION

This invention relates to an aircraft instrumentation system for aircraft and, more particularly, to an instrument for measuring and indicating a linearly varying ratio of the pressure differentials between two pressure locations on the aircraft wing and two more pressure locations remote therefrom, which ratio remains linear even in response to variations in aircraft power and flap setting.

BACKGROUND OF THE INVENTION

It is known that the ability of an aircraft to develop sufficient lift to sustain flight is dependent upon the angle between the wing and the air through which the aircraft flies. This is known as the angle-of-attack of the aircraft. Since it is the prime purpose of an aircraft to stay in flight until the pilot desires to terminate that flight, it is essential that the pilot have knowledge of his angle-of-attack. Without an angle-of-attack display, the pilot must use air speed and then mentally correct it for changes in the aircraft weight, flap setting, power setting and load factor.

The use of wing surface pressures to obtain a pressure coefficient is old in the art; one such example is set forth in Spencer U.S. Pat. No. 2,986,033, which teaches the use of a pressure coefficient which is a function of impact pressure. Impact pressure is not readily determined accurately when the air craft is near stall. The Spencer Patent also uses the angle-of-attack for a display and refers to a ratio between the aircraft's present lift coefficient and the maximum lift coefficient ($C_L/C_{LMAX}$). However, as the flap setting is altered by the pilot, the angle-of-attack for the maximum coefficient of lift and for a coefficient of lift which equals zero will change. If the instrument is labeled in degrees, the pilot will only know the angle-of-attack and will not know at what angle stall will occur or the aircraft's relationship between the lift coefficients of zero and maximum. Therefore, it is highly desirable to provide an instrument for an aircraft which would indicate to the pilot his relative position with respect to stall at all times even when the flap setting and power or throttle setting are changed.

Accordingly, it is an object of this invention to provide in an instrumentation system a family of points on an aircraft at which pressure is detected which will provide a nondouble valued varying of a ratio between selected ones of the pressures detected even when the flap setting and power or throttle setting are changed and sufficient pressure to drive the transducers incorporated into the instrumentation system, which ratio will vary along a single continuous, not necessarily linear, line.

It is a further object of this invention to provide an instrumentation system, as aforesaid, wherein at least two points on the wing of the aircraft are provided which are spaced chordwise thereon at a specified span location from the aircraft fuselage, the remainder of the pressure locations being positioned for sensing the static or barometric pressure on the aircraft.

It is a further object of this invention to provide an instrumentation system, as aforesaid, which can be easily installed into existing aircraft with a minimum of alteration of the aircraft structure, thereby making it possible for such installations to be made in the field.

It is a further object of this invention to provide an instrumentation system, as aforesaid, which is reliable and durable and will indicate to the pilot of the aircraft the aircraft's position with respect to stall at all times even as the power or throttle setting and flap setting are changed.

It is a further object of this invention to provide in an instrumentation system on an aircraft, a family of points on the wing of the aircraft, each being located at a predetermined location on the wing so that the ratio of the differences between selected ones of the pressures will result in a nondouble valued varying coefficient of pressure ratio which remains nondouble valued even when the power or throttle setting and flap setting are altered and remains variable in magnitude along a single continuous, not necessarily linear, line.

It is a further object of this invention to provide an instrumentation system, as aforesaid, which produces an electrical signal output representing the aforesaid nondouble valued ratio totally in response to the particular placement of pressure sensing devices on the aircraft and totally independent of any equipment compensating for variations in the flap setting and/or power setting.

SUMMARY OF THE INVENTION

In general, the objects and purposes of the invention are met by providing an aircraft instrumentation system for indicating the ratio of a pressure differential between two pressure locations on the aircraft and the pressure differential between two more pressure locations on the aircraft remote from the first-mentioned two pressure locations. If desired, one of the first-mentioned two pressure locations on the aircraft can be at a common location with respect to one of the second-mentioned two pressure locations. A device is provided which is responsive to the pressures to determine and indicate the aforesaid coefficient of pressure ratio. The locations for pressure detection are positioned so that the resulting ratio automatically, and without any other auxiliary equipment, remains nondouble valued even when variations are made in the aircraft power setting and flap setting to thereby provide the pilot at all times with a normalized coefficient of lift ($C_{LN}*$) indication to inform the pilot as to the aircraft's orientation relative to the maximum coefficient of lift.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 1:
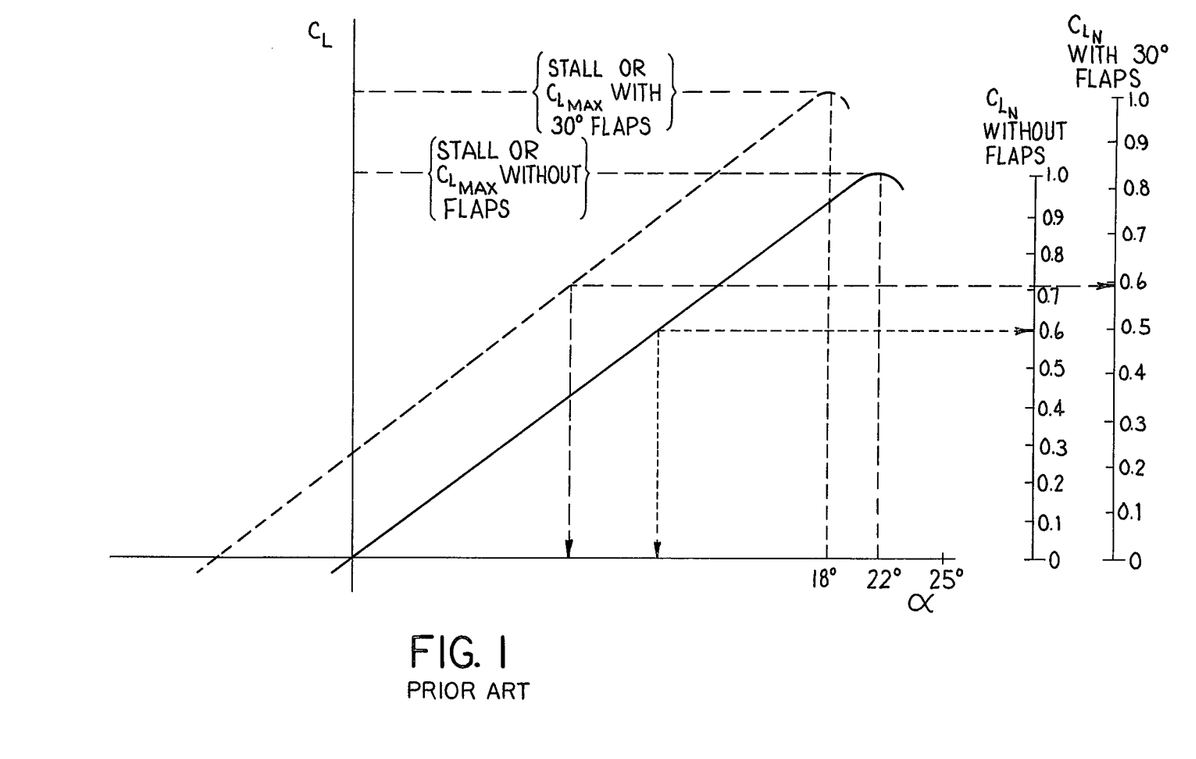
FIG. 1 is a diagram illustrating the known generally linear relationship between the angle-of-attack ($\alpha$) and the coefficient of lift ($C_L$) and the linear double valued relationship of these two factors with the ratio ($C_{LN}$) between the coefficient of lift and the maximum coefficient of lift depending on the flap setting.

As is clearly represented in FIG. 1, an aircraft's angle-of-attack will produce a linearly varying coefficient of lift ($C_L$) which increases as the angle-of-attack increases. The coefficient of lift will continue to increase until it reaches the maximum magnitude therefor, namely the maximum coefficient of lift ($C_{LMAX}$). The ratio ($C_{LN}$) of the coefficient of lift ($C_L$) to the maximum coefficient of lift ($C_{LMAX}$) and its relationship to the angle-of-attack is shown to the right of the diagram in FIG. 1 (see also Hayes U.S. Pat. No. 3,587,311). It is known that by increasing the flap setting from zero degrees to a specified angle, the coefficient of lift ($C_L$) will be increased but stall ($C_{LMAX}$) will occur at a lesser angle-of-attack. This has been indicated in FIG. 1 as being a differential of some four degrees, namely the differential between the angle-of-attack of 22° and 18°.

While in flight, a pilot must control the aircraft in such a way as to remain above the stall speed and below the maximum allowed air speed. The maximum speed is truly an air speed limit for generally structural reasons and remains constant. However, the stall speed is truly a maximum lift coefficient limit. The air speed at which an aircraft stalls changes any time the aircraft weight, "g" loading, flap configuration or throttle setting changes. If the pilot is provided with a lift coefficient indication ($C_L$) or angle-of-attack, he will note that the aircraft will stall at the same lift coefficient, regardless of the aircraft gross weight or load factor. The stall or maximum lift coefficient will, however, change with any change in flap setting or throttle setting. As indicated above, our invention is to provide a nondouble valued varying normalized lift coefficient ($C_{LN}^*$) display, generated solely from pressure detecting devices on the aircraft, different from the normalized coefficient of lift ($C_{LN}$) of the prior art generated by electrical compensation circuits, the nondouble valued relationship of which will vary along a single continuous, not necessarily linear, line and not be affected by variations in flap setting and power setting, thereby uniting the two $C_{LN}$ scales in FIG. 1 into a single scale (see FIG. 4). Our normalized lift coefficient ($C_{LN}^*$) is the aircraft's instantaneous lift coefficient ($C_L$) divided by the stall or maximum lift coefficient ($C_{LMAX}$) for any power setting and flap configuration the aircraft is using. At a $C_{LN}^*$ of 1.0, the aircraft will stall, regardless of the power setting and flap setting. It must be noted at this point in the discussion that an angle-of-attack indicator will not give the pilot the same reading at stall and approach as the flap setting changes. FIG. 1 clearly shows this relationship. The problem which we were confronted with was determining a truly "normalized" lift coefficient ($C_{LN}^*$). The following discussed method for determining and the structure for indicating a $C_{LN}^*$ is based on the location of four pressure measurement points on the aircraft. We discovered that a family of points is present at locations on any aircraft with trailing edge flaps and is either propeller or jet driven to facilitate the generation of a normalized coefficient of lift ($C_{LN}^*$).

Figure 2:
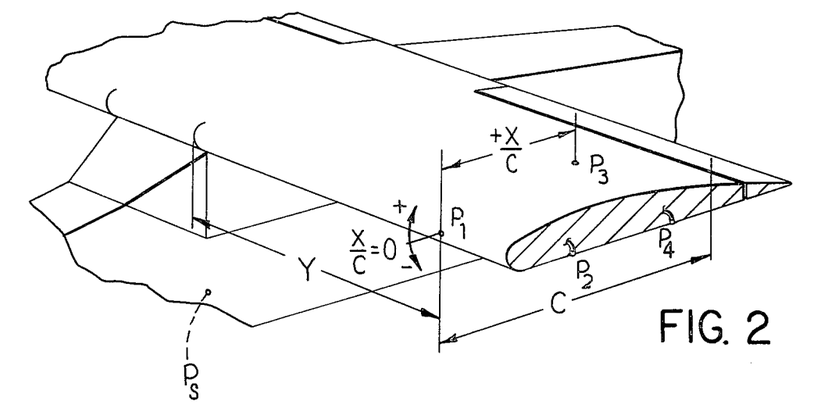
FIG. 2 is a perspective view of a fragment of an aircraft having pressure points indicated on the wing thereof.

The surface pressure coefficient $C_{PX}$ at any point on an airfoil or wing is known to be a function of the angle-of-attack, power setting and flap configuration. Because $C_{LN}$ is a function of the angle-of-attack, power and flap setting, the angle-of-attack can be expressed as a function of $C_{LN}$, power and flap setting. Note that the power setting is only a factor when the slipstream of a propeller or engine exhaust influences the airflow around the wing. Taking this into consideration, the pressure coefficient ($C_{PX}$) can be presented as a function of $C_{LN}$, power and flap setting, as given below:

$$C_{PX} = \frac{P_X - P_S}{P_T - P_S} = f(C_{LN}, \text{flaps, power})$$

where:
$P_X$ = surface pressure at any point (X) on the airfoil or wing
$P_S$ = static pressure (or barometric pressure)
$P_T$ = total pressure From the general form of the coefficient of pressure $C_{PX}$, a new pressure coefficient ($C_P^*$) that involves up to four points on an airfoil can be derived. Referring to FIG. 2 of the drawings, $P_1$, $P_2$, $P_3$ and $P_4$ are shown at differing locations on the wing.

$$P_1 = C_{P1}(P_T - P_S) + P_S$$
$$C_P^* = \frac{P_1 - P_2}{P_3 - P_4} = \frac{C_{P1}(P_T - P_S) + P_S - C_{P2}(P_T - P_S) - P_S}{C_{P3}(P_T - P_S) + P_S - C_{P4}(P_T - P_S) - P_S}$$
$$C_P^* = \frac{C_{P1} - C_{P2}}{C_{P3} - C_{P4}} = f(C_{LN}, \text{flaps, power})$$

The new pressure coefficient ($C_P^*$) can be made to be a function of a normalized lift coefficient ($C_{LN}^*$) alone by choosing points $P_1$, $P_2$, $P_3$ and $P_4$ in a way as to prevent the generation of double valued results caused by changes in the power setting and flap setting.

Because $C_{PX}$ and thus $C_P^*$ is not a function of load factor ("g" loading) and weight, any choice of four point locations would not affect $C_P^*$ being independent of load factor and weight.

In order for $C_P^*$ to be useful as a $C_{LN}$ indication, its dependence on $C_{LN}$ must be maintained. For example, choosing all four points to be co-located would obviously eliminate this relationship and thus would be an unsatisfactory choice.

The chordwise spacing between $C_{P1}$ and $C_{P2}$ and the chordwise spacing between $C_{P3}$ and $C_{P4}$ will determine the total change in the numerator and denominator of $C_P^*$ as $C_{LN}$ goes from 0 to 1.0. The placement of $C_{P1}$ relative to $C_{P3}$ will affect the relationship between the flap setting and $C_P^*$, as long as they are placed on a flapped portion of the wing span. To reduce the effect of power, the chord locations of the points chosen for minimum flap effects are maintained and some or all of their span locations are moved into the influence of the propeller slipstream until the influence of the power setting is reduced to an acceptable level.

Since the coefficient of pressure ($C_P$) is dependent upon the flap setting, as indicated above, the flap setting can be compensated for by examining the equation for $C_P^*$ in the following manner:

$$C_P^* = \frac{C_{P1} - C_{P2}}{C_{P3} - C_{P4}}$$

Let: $C_{PN}(\delta) = C_{P1} - C_{P2}$
$C_{PD}(\delta) = C_{P3} - C_{P4}$
Where: $(\delta)$ = flap angle
$$C_P^*(\delta) = \frac{C_{PN}(\delta)}{C_{PD}(\delta)}$$

In order for $C_P^*(\delta)$ not to change with a flap setting to the angle ($\delta$), the following must be true:

$$C_P^*(0) = *(0) = C_P^*(\delta)$$
$$\frac{C_{PN}(0)}{C_{PD}(0)} = \frac{C_{PN}(\delta)}{C_{PD}(\delta)}$$
$$\frac{C_{PN}(0)}{C_{PN}(\delta)} = \frac{C_{PD}(0)}{C_{PD}(\delta)}$$

Once this relationship is met, $C_P^* = f(C_{LN}, \text{power})$ is true which is one step closer to obtaining a $C_P^*$ that is a function of $C_{LN}$ alone.

In order to find the point location on the aircraft necessary for $C_{PN}(0)/C_{PN}(\delta) = C_{PD}(0)/C_{PD}(\delta)$, the effect of flap deflection on lift coefficient, angle-of-attack, and normalized lift coefficient must be considered (see FIG. 1). Note that if the aircraft is to be flown at the same normalized lift coefficient or uses the same percent of maximum lift coefficient, the angle-of-attack to be flown will be less with flaps than without. At the same time, the lowered flaps influence the approaching airflow, causing it to curve upward toward the airfoil, giving an effective increase in local angle-of-attack that more than offsets the effect of lowering the aircraft's angle-of-attack.

We have dicovered that in the coefficient of pressure formula $$C_P^* = \frac{C_{P1} - C_{P2}}{C_{P3} - C_{P4}}$$

by making the pressure at locations $P_2$ and $P_4$ static or barometric pressure, this made $C_{P2}$ and $C_{P4}$ zero. By leaving the pressure points $P_2$ and $P_4$ to be located at a place on the aircraft wherein static pressure can be measured, a family of points on the airfoil was found to exist for $P_1$ and $P_3$ for which $C_{PN}(0)/C_{PN}(\delta) = C_{PD}(0)/C_{PD}(\delta)$. Any pair of points belonging to this family of points will result in a nullification of the influence of flaps on a varying $C_P^*$. It must be noted that only one $C_{LN}$ can be considered at a time. Points $P_1$ and $P_3$ can be selected from the family of points at a standard landing approach wherein $C_{LN}$ is 0.6, for which a sufficient change in $C_P^*$ with $C_{LN}$ is obtained and errors generated by the flap setting are minimized.

The effect of the power or throttle setting on the varying $C_P^*$ can be nullified as follows:

When the power setting is increased, the airflow within the slipstream becomes faster and the angle-of-attack decreases. The slower the aircraft's speed, the more pronounced these changes become. All of this causes the stall angle-of-attack of the aircraft to increase over the power off stall angle-of-attack. Thus, the angle-of-attack outside of the slipstream will be increased at stall. The end result is an error in the $C_P^*$ vs. $C_{LN}$ relationship when power is increased. This effect is not appreciable until above a $C_{LN}$ of 0.6. The pressure points chosen for minimum flap error may be moved to a point at the boundary of the propeller or jet engine slipstream where the local angle-of-attack neither increases nor decreases with power. At this point, $C_P^*$ will be minimally affected by power as well as flaps. As an end result, the following relationship is true, barring normal instrumentation errors:

$$C_P^* = f(C_{LN})$$

The aforementioned family of points can be determined by noting the chord length C of each airfoil under study and with the position from the midpoint of the leading edge over the top of the airfoil being represented by a factor $+X/C$ and points located on the bottom side of the airfoil being represented by $-X/C$, the various pressure signals can be detected at various ratios of $C_L$ to $C_{LMAX}$. This measurement can be made at numerous points on the airfoil and then selected points can be chosen which will meet the requirements of the transducers to make certain that the pressure differentials will not exceed the limits of the transducers and be wholly independent of changes in flap setting and power setting. In our particular study, we conducted numerous flight tests using a Cessna 150 and the data gathered pertained to the Cessna 150. However, based upon our knowledge of other airfoils, the same technique used in obtaining data for the Cessna 150 will be applicable for other aircraft.

Figure 3:
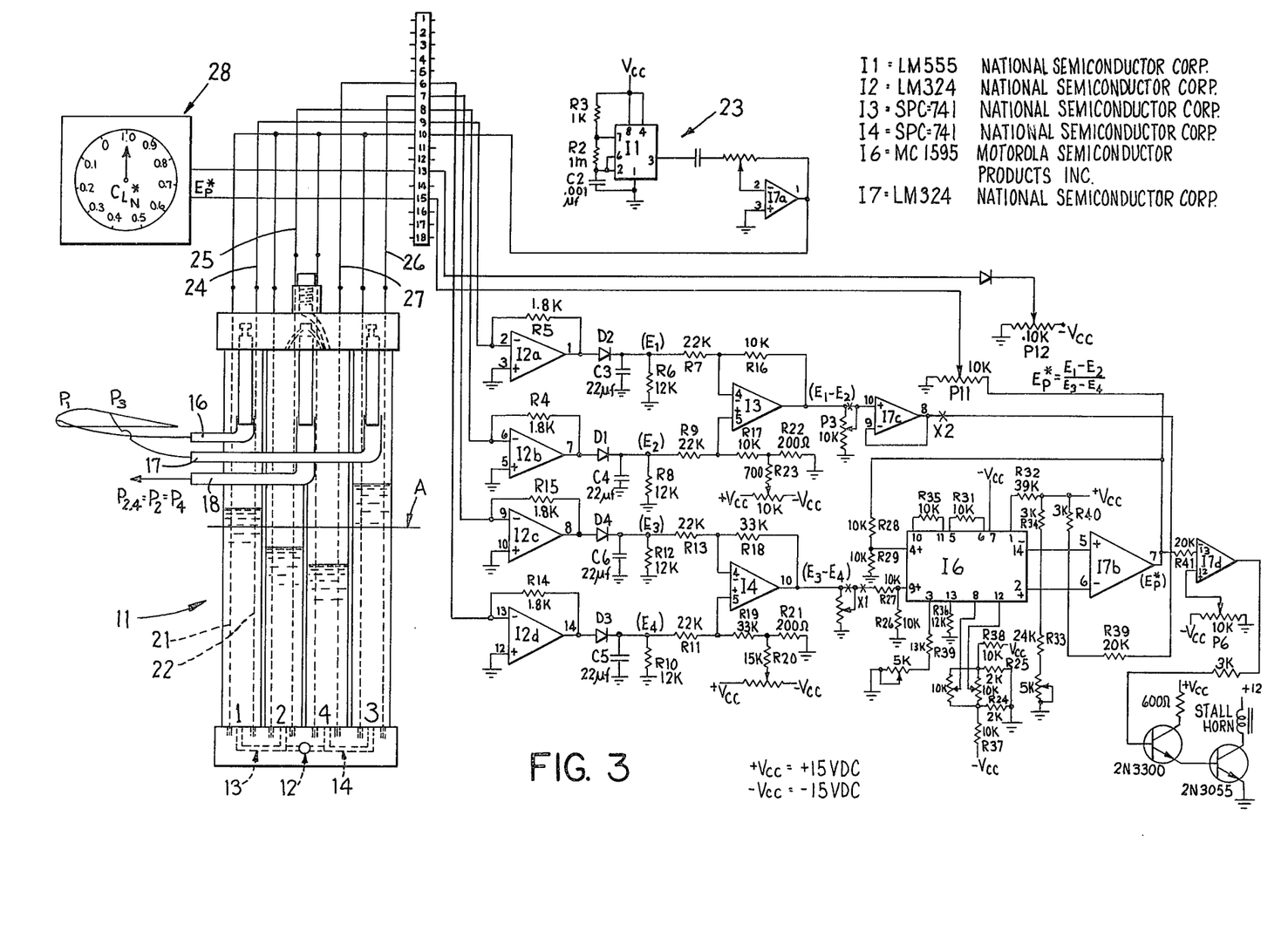
FIG. 3 is an electropneumatic circuit diagram which provides an electrical signal which is proportional to the ratio of two pressure differentials at the selected pressure locations on the aircraft to provide a meter indication of a nondouble valued normalized coefficient of lift ($C_{LN}*$)

As indicated above, and by making the pressure locations for $P_2$ and $P_4$ to detect aircraft static pressure, this led to the placement of points $P_1$ and $P_3$ at the general locations as illustrated in FIGS. 2 and 3. In other words, we have simplified the form of the requirements set forth above that $$\frac{C_{PN}(0)}{C_{PN}(\delta)} = \frac{C_{PD}(0)}{C_{PD}(\delta)}$$
to
$$\frac{C_{P1}(0)}{C_{P1}(\delta)} = \frac{C_{P3}(0)}{C_{P3}(\delta)}$$

That is, we have found that by placing point $P_3$ on top of the airfoil at a $+X/C$ shown in FIG. 2 from pressure point $P_1$ located at $X/C=0$, and at a span Y, that a normalized coefficient of lift ($C_{LN}^*$) will be obtained which remains nondouble valued independent of flap setting and power setting. In other words, and referring to FIG. 4, we have discovered that my normalized coefficient of lift ($C_{LN}^*$) will increase along a single continuous line, though not necessarily linear, with the increase in the coefficient of pressure $C_P^*$ to $C_{LN}^* = 1.0$ at which time stall will occur. In other words, the slope of this line at any given point will always be nonzero. This phenomena was observed independent of flap setting and power setting. The specific dimensional relationships on the Cessna 150 for one set of points in the family of points (see FIG. 2) were $+X/C$ equal to approximately 50% for point $P_3$ and $X/C$ equals approximately zero for point $P_1$ with points $P_2$ and $P_4$ being located to indicate static or barometric pressure ($P_S$). The span Y was equal to twenty-nine inches as measured from the door post on the Cessna 150.

Figure 6:
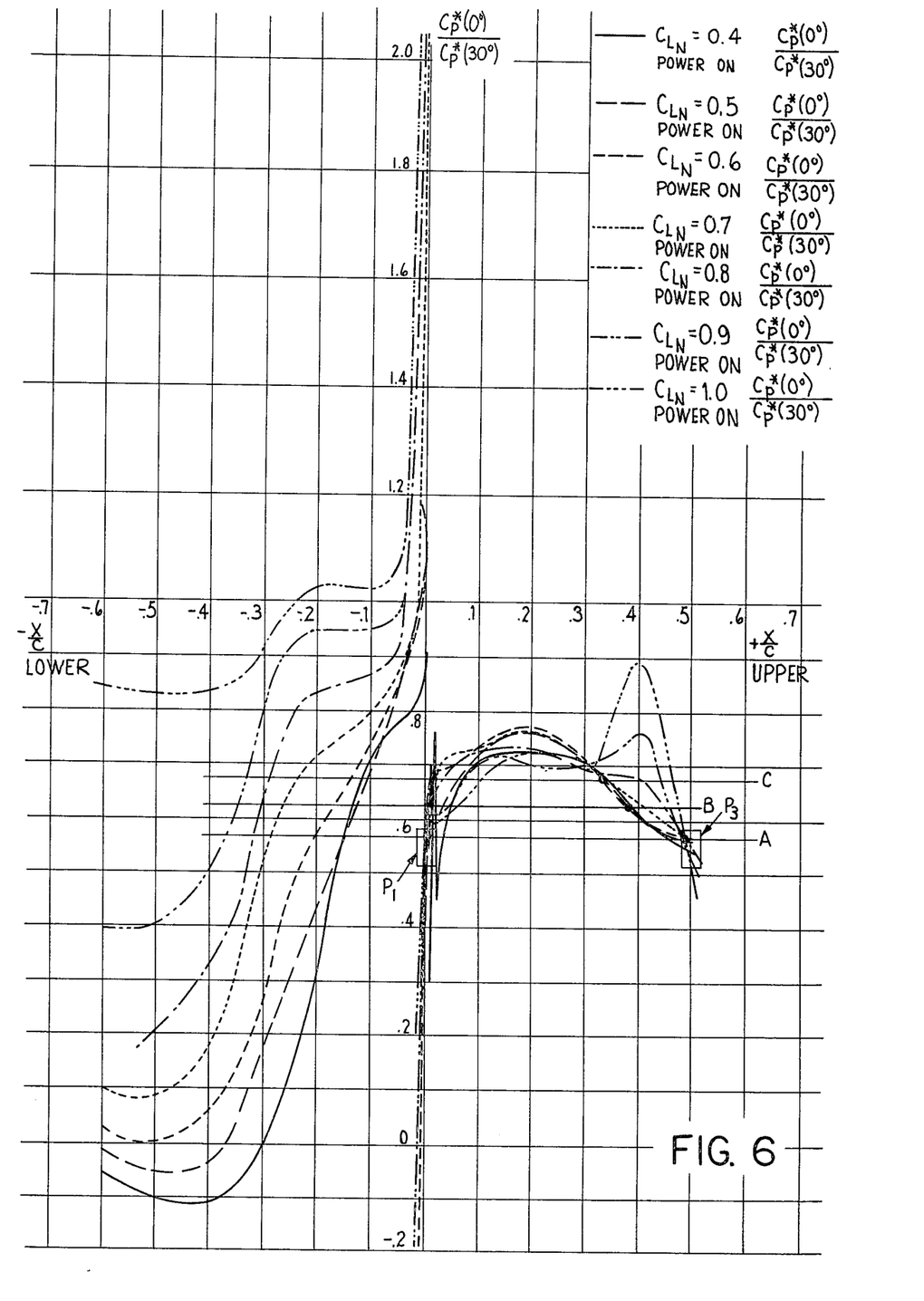
FIG. 6 is a representation of data collected at numerous locations on the wing of an aircraft to show that a family of points exists along a line A at which variations in flap setting and power setting will produce the nondouble valued relationship shown in FIG. 4.
Figure 7:
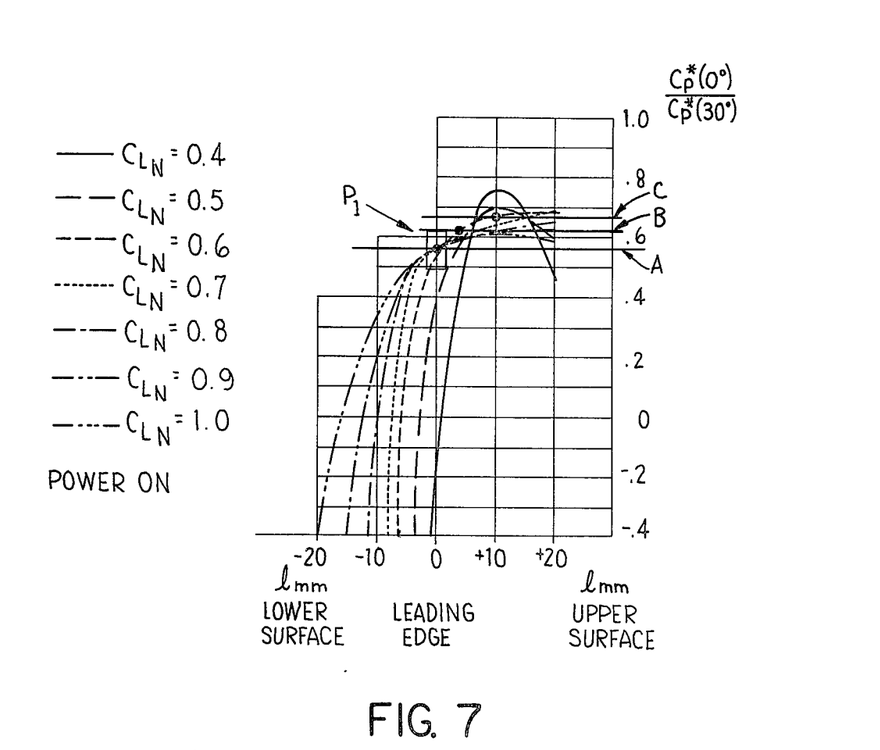
FIG. 7 is an enlargement of the data representation of FIG. 6 particularly at the leading edge of the wing.

More specifically, and referring to FIGS. 6 and 7, $P_1$ and $P_3$ are located by any two intersections of the curve for the design value of $C_{LN}$ ($C_{LN}=0.6$) and any constant $C_P*(0)/C_P*(30)$ line (reference the example lines A, B and C). Any of the above sets of points will eliminate the dependence of $C_P*$ on flap setting but only at $C_{LN}=0.6$. The set of points to be selected from the family of sets of points is the set of points $P_1$ and $P_3$ where the curves for the remaining off design $C_{LN}$ values most nearly all intersect a constant $C_P*(0)/C_P*(30)$ at the same point (reference line A). Using the above criteria, $P_1$ and $P_3$ on a Cessna 150 will be approximately 0% and 50% respectively.

An example of a circuit which we used in order to obtain an indication of my normalized coefficient of lift $C_{LN}*$ is shown in FIG. 3. The value of the circuit components are shown adjacent thereto. Other circuit arrangements are possible and the present disclosure pertaining to the circuit is not to be limiting. The circuit 10 includes a manometer 11 which has four plastic tubes numbered 1 to 4. Each tube is filled with a liquid mixture of fifty percent glycol and fifty percent distilled water to a reference level A. The liquid level in each of the tubes can be balanced through a valve 12 interconnecting a pair of passageways 13 and 14 which are connected in fluid circuit with tubes 1 and 2 and tubes 3 and 4, respectively. The upper ends of the tubes 1 to 4 are closed and air pressure is supplied thereto by tubes connected to pressure sensors on the aircraft. For example, tube 1 has a tube 16 connected thereto, which tube extends to point $P_1$ on the wing of the aircraft whereat the wing surface pressure is measured. Tube 3 is connected through a tube 17 to point $P_3$ on the wing of the aircraft whereat the wing surface pressure is measured. Tubes 2 and 4 are connected to a common tube 18 which extends to a common point $P_{2,4}$ located on the aircraft for detecting aircraft static or barometric pressure. The points $P_1$ and $P_3$ are, as stated above, situated in a position on the wing to detect the wing surface pressure. The wing surface pressure is understood to mean a pressure detected in a tube, the free open end of which is flush with the wing surface and the axis of which is perpendicular to the wing surface. A pair of electrically conductive wire rods 21 and 22 is provided in tube 1 and extends coextensively therein. The wire rods 21 and 22 are parallel and are uniformly spaced in tube 1. An identical arrangement of wire rods is provided in tubes 2, 3 and 4 and further detailed discussion about this arrangement is believed unnecessary. The left wire, in this embodiment, of each tube is connected to an AC oscillator circuit 23. Each of the tubes with the liquid mixture therein defines a capacitor. As the pressures at points $P_1$ to $P_4$ change, the liquid level in each of the tubes will change to result in a linear variation of each tube's capacitance. The AC current detected in each right wire is measured. For example, the right wire in tubes 1 to 4 is identified by the reference numerals 24 to 27, respectively. Thus, by measuring the AC current in each right wire 24 to 27 and converting it to a DC voltage, a voltage signal $E_1$, $E_2$, $E_3$ and $E_4$ is obtained for each tube in the manometer, which voltage signal is a linear function of the liquid height in the manometer. After the voltage signals $E_1$ to $E_4$ are obtained, the voltage signals $E_1$ and $E_2$ are submitted to a difference amplifier I3 and the voltage signals $E_3$ and $E_4$ are submitted to a difference amplifier I4. The differences between $E_1$ and $E_2$ and between $E_3$ and $E_4$ are proportional to the differences between the pressure signals at points $P_1$ and $P_2$ and the difference between the pressure signals at points $P_3$ and $P_4$. These difference signals are then subjected to a quotient circuit I6 to produce an output voltage $E_p$. Since $P_2$ and $P_4$ are equal, the output voltage $E_P*$ equation will prevail:

$$E_P* = \frac{E_1 - E_2}{E_3 - E_4} = \frac{P_1 - P_{2,4}}{P_3 - P_{2,4}} = C_P*$$

Figure 4:
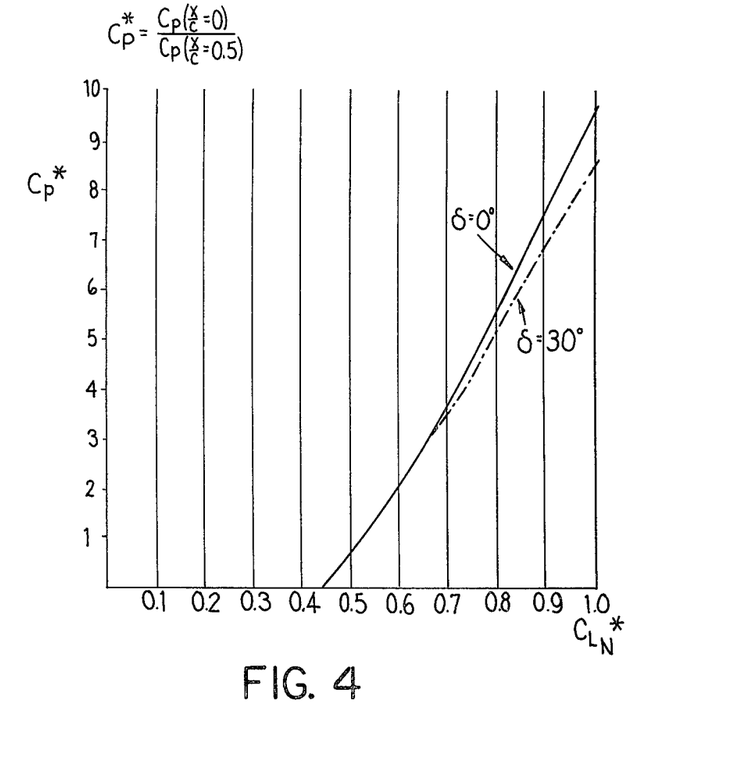
FIG. 4 is a diagram showing the nondouble valued relationship between the coefficient of pressure and the normalized coefficient of lift ($C_P^*$ and $C_{LN}^*$) wherein pressure locations $P_2$ and $P_4$ are equal to the aircraft's static pressure ($P_S$) at a common location on the aircraft, such as the broken line illustrated location on the fuselage in FIG. 2.

The output voltage $E_P*$ is fed to a meter 28 which has a scale thereon calibrated from zero to 1.0. The scale thereon is a representation of the ratio between the coefficient of lift ($C_L$) and the maximum coefficient of lift ($C_{LMAX}$). This ratio is commonly referred to as the normalized coefficient of lift ($C_{LN}$) which varies from zero to 1.0. When no lift is being generated, the $C_{LN}$ is zero and when maximum lift is generated, the $C_{LN}$ is 1.0. For purposes of distinguishing the prior art references to $C_{LN}$, and as stated above, we are designating our normalized coefficient of lift by $C_{LN}*$. Our normalized coefficient of lift $C_{LN}*$, generated by the use of pressure signals alone, is independent of power setting and flap setting and is represented in FIG. 4 for only one of the many possible sets of points within the family of points. Thus, the pilot need not be concerned about making a mental correction for the angle-of-attack, flap setting and power setting utilizing our instrumentation arrangement because our normalized coefficient of lift indicator 28 will show the pilot at all times his position relative to stall ($C_{LN}* = 1.0$).

Figure 5:
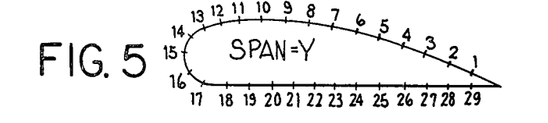
FIG. 5 is a schematic cross section of the airfoil of the wing and illustrating several pressure sensing locations on the surface thereof.

While pressure point $P_1$ is located at the leading edge of the wing ($X/C=0$) and pressure point $P_3$ is located at $X/C=50\%$ and $P_2$ and $P_4$ are located to measure aircraft static pressure, it is also possible to utilize four spaced points $P_1$ to $P_4$ on the wing of the aircraft, as shown in FIG. 2. By taking pressure readings at multiple locations of known airfoils, pressure variations will be noted with variations in angle-of-attack, flap setting and power setting. For example, and referring to FIG. 5, plural test points can be provided around the airfoil at multiple span dimensions Y. The aircraft can be flown varying the angle-of-attack, flap setting and power setting and the pressure readings noted for each of the test points. By comparing the pressure readings at each of the points tested for each span on the aircraft wing, a family of points similar to those shown in FIG. 6 will be noted wherein a comparison of the pressure readings from each of the selected points will produce a positive sloped varying coefficient of pressure ($C_P*$) relationship which remains positively sloped independent of the angle-of-attack, flap setting and throttle setting. Thus, the formula $$C_P* = \frac{P_1 - P_2}{P_3 - P_4}$$

can be utilized with the points $P_1$ to $P_4$ being at varying locations as indicated in FIG. 2 on the wing of the aircraft.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an aircraft instrument system for use on a winged aircraft, an indicator showing a linearly variable ratio of a first pressure differential between a first pressure at a first location on the aircraft and a second pressure at a second location on the aircraft spaced from said first location and a second pressure differential between a third pressure at a third location on the aircraft and a fourth pressure at a fourth location on the aircraft spaced from said third location, first means responsive to said first pressure for producing a first signal, second means responsive to said second pressure for producing a second signal, third means responsive to said third pressure for producing a third signal, fourth means responsive to said fourth pressure for producing a fourth signal, quotient means responsive to said first, second, third and fourth signals for producing a quotient signal representing said linearly variable ratio of said first pressure differential and said second pressure differential, said quotient means being connected to said indicator means, said first, second, third and fourth locations being positioned at a family of points on said aircraft for causing variations in said ratio to remain positively sloped in response to variations in the coefficient of lift ($C_{LN}$) to thereby provide to the pilot a normalized coefficient of lift ($C_{LN}^*$) indication at all times as to the aircraft's orientation relative to the maximum coefficient of lift, said normalized coefficient of lift ($C_{LN}^*$) being wholly independent of flap setting.

2. The aircraft instrument system according to claim 1, wherein two of said first, second, third and fourth locations are positioned on said wing of said aircraft to determine the surface pressure, the remaining two of said locations each being positioned at a common location to determine the aircraft static pressure at said common location.

3. In an aircraft instrument system for use on a winged aircraft, an indicator showing the ratio of a first pressure differential between a first wing surface pressure at a first location on the wing and a second static pressure at a second location on the aircraft spaced from said first location and a second pressure differential between a third wing surface pressure at a third location on the wing and said second static pressure at said second location wherein first means are provided responsive to said first, second and third pressures for producing a signal indicating the ratio of the said differences thus detected, said first means being connected to said indicator so that said indicator will visibly indicate said ratio, at least said first and third locations being positioned at a family of points on said wing for causing variations in said ratio to remain positively sloped in response to variations in the coefficient of lift ($C_{LN}$) to thereby provide to the pilot a normalized coefficient of lift ($C_{LN}^*$) indication at all times as to the aircraft's orientation relative to the maximum coefficient of lift, said normalized coefficient of lift ($C_{LN}^*$) being wholly independent of flap setting.

4. The aircraft instrument system according to claim 3, wherein said first means for producing said signal indicating said ratio of said pressure differentials comprises a liquid manometer having four liquid containing tubes, two of said tubes being subject on one side of said liquid therein to one of said first and third pressures, respectively, each of the remaining two tubes being in fluid connection with one of the first mentioned two tubes and the liquid therein subjected to said second static pressure.

5. The aircraft instrument system according to claim 3, wherein said aircraft instrumentation system is free of electromechanical compensation devices compensating for variations in flap setting and power setting, said ratio being the result of the utilization of said first, second and third pressures and said first means.

6. In an aircraft instrument system for use on a winged aircraft, an indicator showing the ratio of the pressure differential between a first wing surface pressure at a first location on the wing and a second static pressure at a second location on the aircraft spaced from said first location and the pressure differential between a third wing surface pressure at a third location on the wing and said second static pressure at said second location wherein first means are provided responsive to said first, second and third pressures to determine and indicate the ratio of the said differences thus detected, at least said first and third locations being positioned at a family of points on said wing for causing variations in said ratio to remain positively sloped in response to variations in the coefficient of lift ($C_{LN}$) to thereby provide to the pilot a normalized coefficient of lift ($C_{LN}^*$) indication at all times as to the aircraft's orientation relative to the maximum coefficient of lift, said normalized coefficient of lift ($C_{LN}^*$) being wholly independent of flap setting, said first means for determining and indicating said pressure differentials comprising a liquid manometer having four liquid containing tubes, two of said tubes being subject on one side of said liquid therein to one of said first and third pressures, respectively, each of the remaining two tubes being in fluid connection with one of the first mentioned two tubes and the liquid therein subjected to said second static pressure, said first means for determining and indicating further comprising second means for separately transmitting the developed first, second and third pressures to a respective one of said liquid containing tubes, each of said liquid containing tubes having a pair of parallel and spaced electrical conductors extending coextensively therein, said liquid between said wires creating capacitance in each tube, electrical circuit means for converting said capacitances into an electrical signal proportional to the said ratio, said indicator being responsive to said electrical signal to indicate said normalized coefficient of lift.

7. The aircraft instrument system according to claim 6, wherein said liquid is a mixture of glycol and water.

8. The aircraft instrument system according to claim 7, wherein said mixture is fifty percent glycol and fifty percent distilled water.

9. The aircraft instrument system according to claim 6, wherein said first pressure is connected through said second means to a first tube, wherein said second pressure is connected through said second means to a second and third tube and wherein said third pressure is connected through said second means to a fourth tube, said first and second tubes being connected in fluid communication with each other and said third and fourth tubes being connected in fluid communication with each other.

10. The aircraft instrument system according to claim 9, wherein said first location is at the center of the leading edge of said wing spaced laterally from the fuselage a distance of twenty-nine inches and said third location is spaced chordwise from said first location fifty percent of the total chord length from the leading to the trailing edges.

11. A method of selecting points on an aircraft wherein a varying coefficient of pressure ($C_P^*$) having a positive sloped relationship will be determined which is independent of the flap setting and power setting, comprising the steps of:

selecting a wing structure of a specified aircraft;

measuring the variable pressures at selected locations on the wing and at varying span locations on the wing in response to variations in the coefficient of lift ($C_{LN}$), power setting and flap setting;

selecting those pressure locations which will produce a variable coefficient of pressure ($C_P^*$) which satisfies the following equation:

$$C_P^* = \frac{P_1 - P_2}{P_3 - P_4}$$

wherein $P_1$ to $P_4$ represents the selected pressure points on the wing whereat said coefficient of pressure ($C_P^*$) is a function of the coefficient of lift ($C_{LN}$) alone, said positive sloped characteristic of said coefficient of pressure ($C_P^*$) being maintained wholly independent of flap setting to thereby cause said coefficient of pressure ($C_P^*$) to be a function of a nondouble valued normalized coefficient of lift ($C_{LN}^*$), which function is maintained until said normalized coefficient of lift equals 1.0.

12. The method according to claim 11, wherein said pressure locations $P_2$ and $P_4$ are at a common location and sense static pressure.

* * * * *